Nov. 17, 1936.　　G. L. MICHEAL ET AL　　2,061,324
TIRE FOR MINE LOCOMOTIVE WHEELS
Original Filed Dec. 27, 1932　2 Sheets-Sheet 1
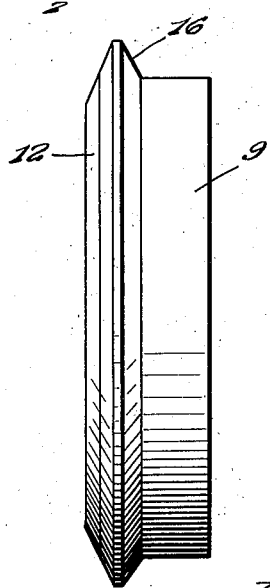
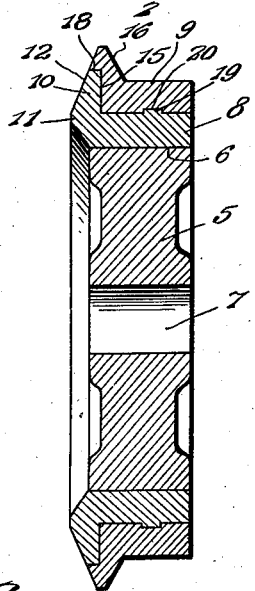
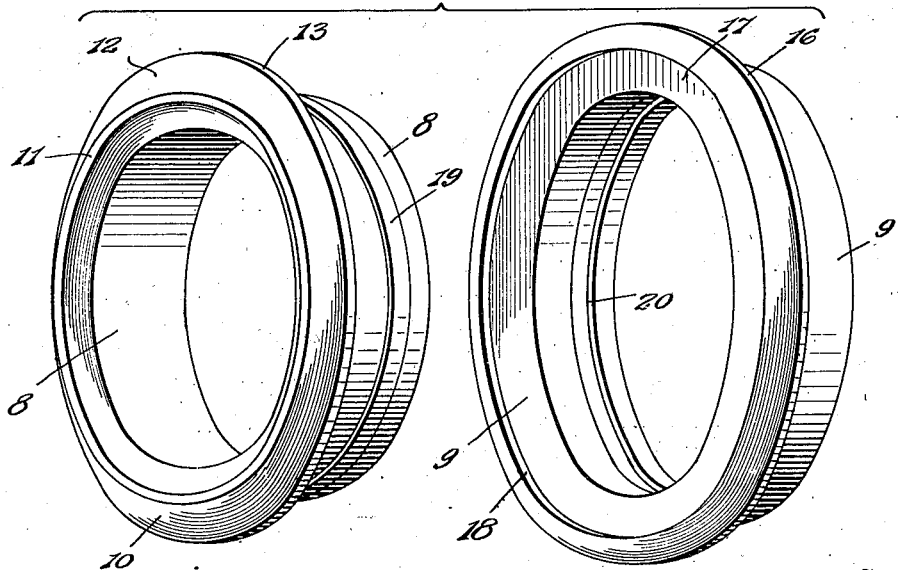
Inventors
G. L. Micheal.
P. Brumbach.
By Lacey & Lacey,
Attorneys Nov. 17, 1936.   G. L. MICHEAL ET AL   2,061,324
TIRE FOR MINE LOCOMOTIVE WHEELS
Original Filed Dec. 27, 1932   2 Sheets-Sheet 2
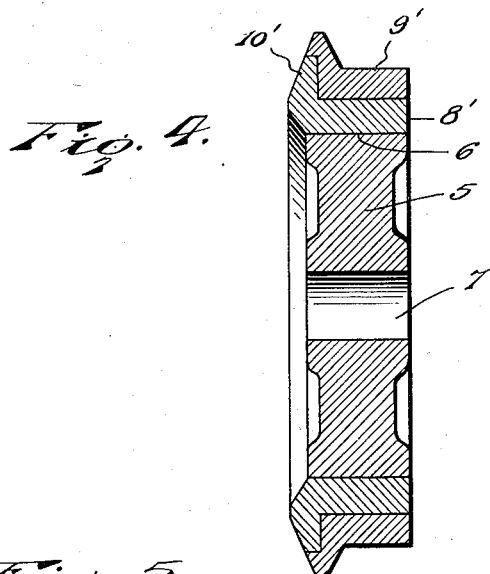
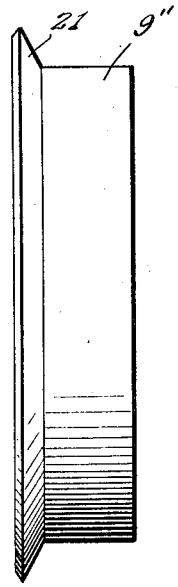
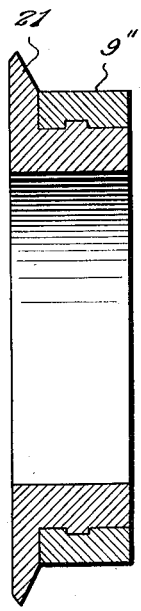
Inventors
G. L. Micheal
P. Brumbach.
By Lacey & Lacey, Attorneys Patented Nov. 17, 1936

2,061,324

UNITED STATES PATENT OFFICE 2,061,324

TIRE FOR MINE LOCOMOTIVE WHEELS

George L. Micheal and Price Brumbach, Harlan, Ky.; said Micheal assignor to R. B. Maw, Pineville, Ky.

Application December 27, 1932, Serial No. 649,093
Renewed April 11, 1936

8 Claims. (Cl. 295—15)

This invention relates to mine car wheels and more particularly to a novel form of tire especially adapted for application to the wheels of mine locomotives.

In coal mine haulage, the treads of motor wheels wear rapidly, due to sanding of the tracks to increase friction, and as the treads of the wheels are much wider than the track rails the wear manifests itself in the form of a groove or channel in the tread next to the gauge flange, leaving a circumferential ridge which hammers and mutilates the switch frogs and otherwise causes damage to the track.

The object of the present invention is to provide a tire for the wheels of mine locomotives which will effectually overcome these objectionable features and in which the tread and rail engaging flange may be readily removed and renewed when desired at very little cost, thereby extending the effective life of the wheel and obviating the expense of replacement of an entirely new wheel.

A further object is to provide a tire formed in two sections, one of which is provided with a circumferential seat adapted to receive a correspondingly shaped rib on the other section whereby the sections are interlocked and lateral movement of one relative to the other effectually prevented.

A still further object of the invention is generally to improve this class of devices so as to increase their utility, durability and efficiency.

In the accompanying drawings forming a part of the specification:

Figure 1 is an end elevation of a mine locomotive wheel embodying the present invention.

Figure 2 is a vertical section thereof.

Figure 3 is a perspective view showing the two units comprising the sectional tire detached and ready to be assembled.

Figure 4 is a vertical sectional view illustrating a modified form of the invention with the interlocking tongue and groove omitted.

Figure 5 is an end view of a further modification.

Figure 6 is a vertical sectional view of Figure 5.

Similar numerals of reference indicate corresponding parts in all the figures of the drawings.

The improved two-part tire forming the subject matter of the present invention is particularly designed for application to the wheels of mine locomotives and the like and by way of illustration is shown in connection with such a wheel in which 5 designates the wheel blank having a rim 6 and a centrally disposed opening 7 adapted to receive an axle. The device comprises two units, the member 8 constituting the tire for application to the rim 6 of the wheel and the member 9 a tread adapted to fit over the tire member, as shown. The tire 8 is provided at its inner end with a radially extended circumferential flange 10, the inner face of which is preferably thickened at 11 and inclined in opposite directions, as shown at 12, thereby to reinforce and strengthen the inner face of the flange and provide a smooth unobstructed surface. The periphery of the flange 10 is turned or otherwise formed with a transversely flat peripheral edge 13 while the outer portion of the flange is provided with a straight surface 15 which extends to and intersects the adjacent outer face of the tire. Fitted on the tire 8 is the tread portion 9 having a rail engaging flange 16 projecting therefrom and preferably formed integral therewith, the inner face of the flange 16 and the adjacent portion of the tread being provided with a circumferential seat 17 adapted to receive the terminal flange 10. The seat 17 extends continuously around the inner face of the tread 9 and defines a shoulder 18 which overlaps and bears against the transversely flat peripheral edge 13 of the terminal flange of the tire. The inner face of the rail engaging flange 16 is preferably inclined to conform to and forms a continuation of the inclined face 12 of the flange 10 so that a smooth joint is formed at the junction of the shoulders 13 and 18 and no surface projections are presented at the inner face of the wheel. The tire 8 is preferably formed with a medial circumferential rib 19 which engages a correspondingly shaped groove or channel 20 formed in the lower face of the tread portion 9 so that when the tread portion is heated and fitted over the tire and then allowed to shrink, the rib and groove will interlock and thus effectually prevent lateral displacement of the tread. Owing to the formation of the seat 17, the tread portion will have a shrinking fit with the tire 8 at the straight face 15 of the terminal flange and at the outer face of the tire proper and this shrinking fit is, of course, supplemented by the action of the rib and groove connection between the tire and tread.

In assembling the sections, the tread portion 9 is heated and then slipped over the tire portion 8 and as the tread portion cools the metal will shrink and thereby not only produce a shrinking fit at the points previously mentioned but also cause the locking rib to fit snugly within the channel or groove in the tread portion. When the parts are thus assembled they may be secured in position on the rim of the wheel blank by heating and shrinking the same thereon or in any other suitable or preferred manner. It will thus be seen that should a groove or channel form in the tread surface of the member 9, due to constant use of the wheel on sanded rails, the tread portion, including the rail engaging flange 16, may be readily removed and renewed at very little expense and without the necessity of providing an entirely new wheel.

In Figure 4 of the drawings there is illustrated a modified form of the invention in which the rib and groove are omitted, the tread 9' being retained in position on the tire 8' solely by the shrinking fit between the terminal flange 10' and the adjacent portion of the tread and between the tread and tire. In certain cases we have found this form of device very desirable and it will, therefore, be understood that the tires may be constructed with or without the interlocking rib and groove without departing from the spirit of the invention.

In Figures 5 and 6 there is illustrated a further modification in which the rail engaging flange 21 is formed on the inner portion of the tire proper instead of on the tread and the tread 9" bears directly against the inner face of the rail engaging flange 21. In this form of the device the interlocking rib and groove are preferably employed to assist in preventing lateral displacement of the tread portion but it will be understood that they may be omitted if desired. It will furthermore be understood that instead of having the rib formed on the tire portion and the groove in the tread portion, these elements may be reversed, as the result accomplished is the same in both cases.

It will also be understood that while it is preferred to use the two units comprising the tire assembled on a wheel, as shown in the drawings, if desired, the wearing parts such as the tread and rail engaging flange may be applied directly to the rim of a wheel without using the tire proper.

Having thus described the invention, what we claim is:

1. A device of the class described comprising a wheel body, a tire fitting over said body and having a terminal radially extended circumferential flange the peripheral edge of which is flattened transversely, a removable tread member having an integral rail engaging flange, the inner face of which is formed with a seat adapted to receive the terminal flange and defining an angular circumferential shoulder overhanging and bearing against the flat peripheral edge of the terminal flange whereby to form a step joint between the parts.

2. A device of the class described comprising a tire having one end thereof provided with a radially extended terminal flange, the inner face of which is thickened and outwardly beveled, a tread member having an integral rail engaging flange the inner face of which is formed with a circumferential seat adapted to receive the terminal flange and defining an annular shoulder overhanging and fitting against the peripheral edge of the terminal flange, the inner face of the rail engaging flange being inclined to conform to and forming a continuation of the beveled face of the terminal flange.

3. A device of the class described comprising a tire having a terminal radially extended flange, the outer face of which is straight and intersects the periphery of the tire, said terminal flange having its inner face thickened and inclined in opposite direction, and a tread member fitted to the tire and having an integral rail engaging flange, the inner face of which is formed with a seat adapted to receive the terminal flange with the straight face of the terminal flange bearing against the adjacent face of the tread member.

4. A device of the class described comprising a wheel body, a tire fitting over said body and having a radially extended circumferential flange provided with a straight outer face, and a removable tread member fitted to the tire and provided with a seat extending over the flange and adapted to receive the same and having a straight face for contact with the straight outer face of said flange whereby to form a step joint between the parts.

5. A device of the class described comprising a wheel body, a tire fitting over said body and having a terminal radially extended flange, and a removable tread member fitted to the tire and provided with a rail-engaging flange having a circumferential seat adapted to receive the terminal flange and defining an angular circumferential shoulder overlapping and bearing against the peripheral edge of said terminal flange whereby to form a step joint between the parts.

6. A device of the class described comprising a wheel body, a tire fitting over said body and having a terminal radially extended circumferential flange and an annular locking rib spaced from said flange, and a removable tread member having a circumferential seat adapted to receive the terminal flange and provided with an annular groove receiving the rib, said seat defining an angular circumferential shoulder overlapping and bearing against the peripheral edge of said terminal flange whereby to form a step joint between the parts.

7. A device of the class described comprising a wheel body, a tire fitting over said body and having one end thereof provided with a radially extended terminal flange, and a removable tread member fitted upon the tire and provided with an integral rail-engaging flange having a circumferential seat adapted to receive the terminal flange and provided with a straight face bearing directly against the outer straight face of the terminal flange to form a step joint, said tread member having a shrinking fit at said seat and at the periphery of the tire.

8. A device of the class described comprising a wheel body, a tire fitting over said body and having one end thereof provided with a radially extended terminal flange having a straight outer face and its periphery formed with an annular rib between said flange and the other end of said tire, and a removable tread member having an integral rail-engaging flange overlapping the terminal flange and provided with a seat adapted to receive the terminal flange, said seat being provided with a straight face contacting with the straight outer face of the terminal flange to form a step joint, there being a circumferential groove formed in the inner face of the tread member adapted to receive said rib.

GEORGE L. MICHEAL.
PRICE BRUMBACH.